United States Patent
Kim et al.

(10) Patent No.: US 9,880,532 B2
(45) Date of Patent: Jan. 30, 2018

(54) METHOD FOR CONTROLLING NETWORK-TYPE ACTUATOR MODULE

(71) Applicant: ROBOTIS CO., LTD., Seoul (KR)

(72) Inventors: Byoung-Soo Kim, Seoul (KR); Hee-Il Kim, Gyeonggi-do (KR)

(73) Assignee: ROBOTIS CO., LTD., Seoul (KR)

( * ) Notice: Subject to any disclaimer, the term of this patent is extended or adjusted under 35 U.S.C. 154(b) by 488 days.

(21) Appl. No.: 14/354,566

(22) PCT Filed: Oct. 26, 2012

(86) PCT No.: PCT/KR2012/008905
§ 371 (c)(1),
(2) Date: Apr. 26, 2014

(87) PCT Pub. No.: WO2013/062379
PCT Pub. Date: May 2, 2013

(65) Prior Publication Data
US 2015/0120002 A1    Apr. 30, 2015

(30) Foreign Application Priority Data

Oct. 26, 2011   (KR) .......................... 10-2011-0110067

(51) Int. Cl.
*G05B 11/01*    (2006.01)
*G05B 15/02*    (2006.01)
(Continued)

(52) U.S. Cl.
CPC ........... *G05B 15/02* (2013.01); *G05B 19/414* (2013.01); *H04L 67/10* (2013.01);
(Continued)

(58) Field of Classification Search
None
See application file for complete search history.

(56) References Cited

U.S. PATENT DOCUMENTS 4,742,475 A * 5/1988 Kaiser ................ G05D 23/1905
                                        165/208
5,381,341 A * 1/1995 Herrala ..................... D21F 7/06
                                        162/252
(Continued)

FOREIGN PATENT DOCUMENTS

JP    2001-147706 A    5/2001
JP    2003-340773 A    12/2003
(Continued)

OTHER PUBLICATIONS

"Embedded server for Data Acquisition Systems" by Goran Nikolic, Sep. 21, 2010, 43 pages [online][retrieved on Apr. 5, 2017]. Retrieved from <http://systems.ihp-microelectronics.com/uploads/downloads/DAAD2010_M2_Nikolic4.pdf>.*

(Continued)

*Primary Examiner* — Evral E Bodden
(74) *Attorney, Agent, or Firm* — Revolution IP, PLLC (57) ABSTRACT

Described herein is a method for controlling a network-type actuator module, and provides a method for controlling a plurality of network-type actuator modules which are connected to a main controller through a multi-drop scheme including the steps of: the main controller transmitting to the actuator module one instruction packet comprising a plurality of IDs; and an actuator module, which corresponds to the ID, transmitting a status packet to the main controller, wherein the actuator module transmits the status packet according to the order of the ID, which is expressed on the instruction packet. Accordingly, unlimited information required from the plurality of actuators can be read from a single transmission of the packet instruction by flexibly expanding limitations due to limitations on the length of each field in accordance with an instruction set and a definition of a parameter.

4 Claims, 6 Drawing Sheets

(51) Int. Cl.
   *H04L 29/08*     (2006.01)
   *G05B 19/414*    (2006.01)
(52) U.S. Cl.
   CPC .............. *G05B 2219/33147* (2013.01); *G05B 2219/33166* (2013.01); *G05B 2219/33176* (2013.01)

(56) References Cited

U.S. PATENT DOCUMENTS

| | | | |
|---|---|---|---|
| 6,480,587 B1* | 11/2002 | Rao | G06F 3/023 379/110.01 |
| 2003/0155470 A1* | 8/2003 | Young | A63H 19/24 246/122 A |
| 2004/0064216 A1* | 4/2004 | Coogan | G05B 19/0421 700/275 |
| 2005/0204061 A1* | 9/2005 | Farchmin | G05B 19/0423 709/245 |
| 2006/0156059 A1* | 7/2006 | Kitamura | G06F 11/1092 714/6.21 |
| 2007/0061018 A1* | 3/2007 | Callaghan | G05B 19/05 700/1 |

FOREIGN PATENT DOCUMENTS

| | | |
|---|---|---|
| KR | 10-0846177 B1 | 7/2008 |
| KR | 10-2009-0027302 A | 3/2009 |

OTHER PUBLICATIONS

International Search Report for PCT/KR2012/008905.

\* cited by examiner

| | Address | Item | Access | Initial Value |
|---|---|---|---|---|
| Control Table | 0 (0X00) | Model Number(L) | RD | 116 (0X74) |
| | 1 (0X01) | Model Number(H) | RD | 0 (0X00) |
| | 2 (0X02) | Version of Firmware | RD | ? |
| | 3 (0X03) | ID | RD,WR | 1 (0X01) |
| | 4 (0X04) | Baud Rate | RD,WR | 34 (0X22) |
| | 5 (0X05) | Return Delay Time | RD,WR | 250 (0XFA) |
| | 6 (0X06) | CW Angle Limit(L) | RD,WR | 0 (0X00) |
| | 7 (0X07) | CW Angle Limit(H) | RD,WR | 0 (0X00) |
| | 8 (0X08) | CCW Angle Limit(L) | RD,WR | 255 (0XFF) |
| | 9 (0X09) | CCW Angle Limit(H) | RD,WR | 3 (0X03) |
| EEPROM Area | 10 (0X0A) | (RESERVED) | -- | 0 (0X00) |
| | 11 (0X0B) | The Highest Limit Temperature | RD,WR | 85 (0X55) |
| | 12 (0X0C) | The Lowest Limit Voltage | RD,WR | 60 (0X3c) |
| | 13 (0X0D) | The Highest Limit Voltage | RD,WR | 190 (0XBE) |
| | 14 (0X0E) | Max Torque(L) | RD,WR | 255 (0XFF) |
| | 15 (0X0F) | Max Torque(H) | RD,WR | 3 (0X03) |
| | 16 (0X10) | Status Return Level | RD,WR | 2 (0X02) |
| | 17 (0X11) | Alarm LED | RD,WR | 4 (0X04) |
| | 18 (0X12) | Alarm Shutdown | RD,WR | 4 (0X04) |
| | 19 (0X13) | (RESERVED) | RD,WR | 0 (0X00) |
| | 20 (0X14) | Down Calibration(L) | RD | ? |
| | 21 (0X15) | Down Calibration(H) | RD | ? |
| | 22 (0X16) | Up Calibration(L) | RD | ? |
| | 23 (0X17) | Up Calibration(H) | RD | ? |
| | 24 (0X18) | Torque Enable | RD,WR | 0 (0X00) |
| | 25 (0X19) | LED | RD,WR | 0 (0X00) |
| | 26 (0X1A) | CW Compliance Margin | RD,WR | 0 (0X00) |
| | 27 (0X1B) | CCW Compliance Margin | RD,WR | 0 (0X00) |
| | 28 (0X1C) | CW Compliance Slope | RD,WR | 32 (0X20) |
| | 29 (0X1D) | CCW Compliance Slope | RD,WR | 32 (0X20) |
| | 30 (0X1E) | Goal Position(L) | RD,WR | (Addr36)value |
| | 31 (0X1F) | Goal Position(H) | RD,WR | (Addr37)value |
| | 32 (0X20) | Moving Speed(L) | RD,WR | 0 |
| | 33 (0X21) | Moving Speed(H) | RD,WR | 0 |
| RAM Area | 34 (0X22) | Torque Limit(L) | RD,WR | (Addr14)value |
| | 35 (0X23) | Torque Limit(H) | RD,WR | (Addr15)value |
| | 36 (0X24) | Present Position(L) | RD | ? |
| | 37 (0X25) | Present Position(H) | RD | ? |
| | 38 (0X26) | Present Speed(L) | RD | ? |
| | 39 (0X27) | Present Speed(H) | RD | ? |
| | 40 (0X28) | Present Load(L) | RD | ? |
| | 41 (0X29) | Present Load(H) | RD | ? |
| | 42 (0X2A) | Present Voltage | RD | ? |
| | 43 (0X2B) | Present Temperature | RD | ? |
| | 44 (0X2C) | Present Instruction | RD,WR | 0 (0X00) |
| | 45 (0X2C) | (RESERVED) | -- | 0 (0X00) |
| | 46 (0X2E) | Moving | RD | 0 (0X00) |
| | 47 (0X2F) | Lock | RD,WR | 0 (0X00) |
| | 48 (0X30) | Punch(L) | RD,WR | 32 (0X20) |
| | 49 (0X31) | Punch(H) | RD,WR | 0 (0X00) |

| Write Address | Writing Item | Length (bytes) | Min | Max |
|---|---|---|---|---|
| 3 (0X03) | ID | 1 | 0 | 253(0xfd) |
| 4 (0X04) | Baud Rate | 1 | 0 | 254(0xfe) |
| 5 (0X05) | Return Delay Time | 1 | 0 | 254(0xfe) |
| 6 (0X06) | CW Angle Limit | 2 | 0 | 1023(0x3ff) |
| 8 (0X08) | CCW Angle Limit | 2 | 0 | 1023(0x3ff) |
| 11 (0X0B) | the Highest Limit Temperature | 1 | 0 | 150(0x96) |
| 12 (0X0C) | the Lowest Limit Voltage | 1 | 50(0x32) | 250(0xfa) |
| 13 (0X0D) | the Highest Limit Voltage | 1 | 50(0x32) | 250(0xfa) |
| 14 (0X0E) | Max Torque | 2 | 0 | 1023(0x3ff) |
| 16 (0X10) | Status Return Level | 1 | 0 | 2 |
| 17 (0X11) | Alarm LED | 1 | 0 | 127(0x7f) |
| 18 (0X12) | Alarm Shutdown | 1 | 0 | 127(0x7f) |
| 19 (0X13) | (RESERVED) | 1 | 0 | 1 |
| 24 (0X18) | Torque Enable | 1 | 0 | 1 |
| 25 (0X19) | LED | 1 | 0 | 1 |
| 26 (0X1A) | CW Compliance Margin | 1 | 0 | 254(0xfe) |
| 27 (0X1B) | CCW Compliance Margin | 1 | 0 | 254(0xfe) |
| 28 (0X1C) | CW Compliance Slope | 1 | 0 | 254(0xfe) |
| 29 (0X1D) | CCW Compliance Slope | 1 | 0 | 254(0xfe) |
| 30 (0X1E) | Goal Position | 2 | 0 | 1023(0x3ff) |
| 32 (0X20) | Moving Speed | 2 | 0 | 1023(0x3ff) |
| 34 (0X22) | Torque Limit | 2 | 0 | 1023(0x3ff) |
| 44 (0X2C) | Present Instruction | 1 | 0 | 1 |
| 47 (0X2F) | Lock | 1 | 0 | 1 |
| 48 (0X30) | Punch | 2 | 0 | 1023(0x3ff) |

METHOD FOR CONTROLLING NETWORK-TYPE ACTUATOR MODULE

CROSS REFERENCE TO RELATED APPLICATIONS AND CLAIM OF PRIORITY

This patent application is a National Phase application under 35 U.S.C. §371 of International Application No. PCT/KR2012/008905, filed Oct. 26, 2012, which claims priority to Korean Patent Application No. 10-2011-0110067 filed Oct. 26, 2011, entire contents of which are incorporated herein by reference.

BACKGROUND

1. Field of the Invention

The invention relates to methods for controlling actuators. The actuators are applicable to the robotics industry.

2. Description of Related Art

As is well known, an actuator having a deceleration function for flexible movement of a joint is used in robots within various fields, including industrial robots to humanoid robots.

Particularly, in robotics technology, which has been rapidly developed in recent years, an existing robotics mechanism used solely for a specific industry is coupled with the fields of other industries for technical fusion and composition. An example includes the development and production of a home cleaning robot, a programmable education robot, a toy robot, an entertainment robot, and the like.

In such robot technology, it is very important to control a driving-related actuator, or more exactly, a driving motor.

For example, a robot having a multitude of actuators requires an enhanced control mechanism in order to accurately control each of the actuators, and also organically control all the actuators in a correlative manner.

Particularly, when a large number of actuators are controlled by one central controller, a sensor unit (i.e., encoders 1, . . . , n) which senses a state of the actuator, and a driving unit (i.e., motors 1, . . . , n) for supplying a driving voltage to the actuator, are included for each actuator, and thus, four wirings are necessary between an actuator control unit (i.e., a motor controller) and the driving unit, and six separate wirings are necessary between the actuator control unit and the sensor unit.

Therefore, when N actuators are connected to the actuator control unit, a total of 10n wirings are necessary. As the number of actuators constituting the robot increases, the structure of the robot is greatly limited due to difficulty in wiring handling. In addition, if the number of actuators should increase or decrease due to a change in the design of the robot, then problems arise in that it becomes necessary to change all of the actuator controllers, sensor units, and driving units.

In the conventional actuator, since the types of information which can be fed back from the sensor unit are limited to a rotational speed, a position, and the like, of the motor, it is difficult to implement an automatic control mechanism which directly recognizes and copes with a problem generated in the operation of the actuator, such as overcurrent generation or internally overheating.

In addition, in a scheme wherein a large number of actuators are directly connected to the actuator control unit, a plurality of actuators should be accurately controlled simultaneously or sequentially in order to control the large number of actuators in a correlative manner. A load of signal processing according to such a control process is all concentrated on one actuator control unit, and thus, it is difficult to expect a smooth operation of the robot having the large number of actuators.

In order to address and improve the above, the applicant has filed a patent application titled "Network-type Actuator Module" on Dec. 21, 2006 (Korean Patent Application No. 2006-0131526 and Patent No. 0846177).

However, robot technology has continuously evolved, and there is a need for fast and simultaneous collection and processing of a variety of information related to driving the robot.

Therefore, a protocol re-maintenance task is required to realize more flexible driving control by enhancing the patented technology of the applicant.

SUMMARY

In one embodiment, provided is a method for controlling a network-type actuator module capable of reading necessary information from a large number of actuators, without substantial limitation through one packet instruction transfer, by flexibly removing restrictions due to the limitation of the length of each field according to the definition of an instruction set and parameters, and rapidly and accurately controlling each actuator by removing delay time between packets at the time of control of the actuator.

In another embodiment, provided is a method for controlling a plurality of network-type actuator modules connected to a main controller in a multi-drop scheme, the method including: transferring, by the main controller, one instruction packet including a plurality of IDs to the actuator modules; and transferring, by the actuator module corresponding to the ID, a status packet to the main controller, wherein the actuator modules transfer the status packet in the order of IDs indicated by the instruction packet.

Here, the instruction packet includes an ID, a length of data to be read from the actuator module corresponding to the ID, and a start address of the data to be read from the actuator module corresponding to the ID, which are repeatedly represented in the order of the IDs In this case, each of the ID, the length of the data, and the start address of the data may include 2 bytes, which includes an upper byte and a lower byte.

Further, the actuator module corresponding to a subsequent ID in the instruction packet may transfer the status packet after the actuator module corresponding to a preceding ID has transferred the status packet.

Accordingly, it is possible to read necessary information from a large number of actuators, without substantial limitation through one packet instruction transfer, by flexibly removing restrictions due to a limitation of the length of each field according to the definition of the instruction set and the parameters, and control each actuator. Thus, it is possible to achieve more precise, sophisticated, and accurate control.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 3 is an illustrative diagram of a control table to explain the control method according to one embodiment of the present invention;

DETAILED DESCRIPTION OF EXEMPLARY EMBODIMENTS

Hereinafter, exemplary embodiments of the present invention will be described in detail with reference to the accompanying drawings.

Since the actuator module, which may be one configuration of the present invention, is described within Korean Patent No. 10-0846177 and hereby incorporated by reference in its entirety, a thorough description of the configuration is omitted for clarity, and only the parts related to one embodiment of the control method will be selectively described.

Further, the control method according to one embodiment of the present invention is intended to shorten time by reducing the communication packet amount while using the same bandwidth, additionally define a new instruction set via removing instructions, and expand the length of an address and the length of data by redefining parameters.

For example, since all are conventionally designated as one byte, the number of addresses that are readable may be 255, and the length of data may be 255. On the other hand, all are designated to 2 bytes such that the number of addresses and the length of data that are readable can be greatly expanded through redefinition of parameters.

In other words, a control relationship before an expansion concept encompasses an address of a value to be controlled, through a control table of an actuator module, is checked, then an instruction packet is generated with reference to an ID and the address, followed by the generated instruction packet being sent via a communications bus. This read packet is then checked by each module, then an instruction and a parameter are checked to confirm the control table of the module if it is checked that an ID is an ID of the module, and a status packet is then generated and sent via a communication bus to perform a response. When another extension concept is applied to the present invention, a process of adding an instruction, a process of defining a parameter for the added instruction, and a process of upgrading firmware using a program so that each module can recognize the added instruction and the parameter, are included in a packet generation process during such a basic control. This is included in a concrete description which will be described below. Examples may include BULK_READ and BULK_WRITE added to a table of an instruction set.

In addition, conventionally, when a response is performed after a status packet is generated, only a response to the status packet is sent; whereas in the present invention, status packets are sent as responses in order, in which transfer of a status packet of a preceding stage is monitored, and a status packet of a module is sent as soon as the status packet of the preceding stage is returned, such that a response delay between the packets, i.e., a return delay time, is removed to shorten the time.

Figure 1:
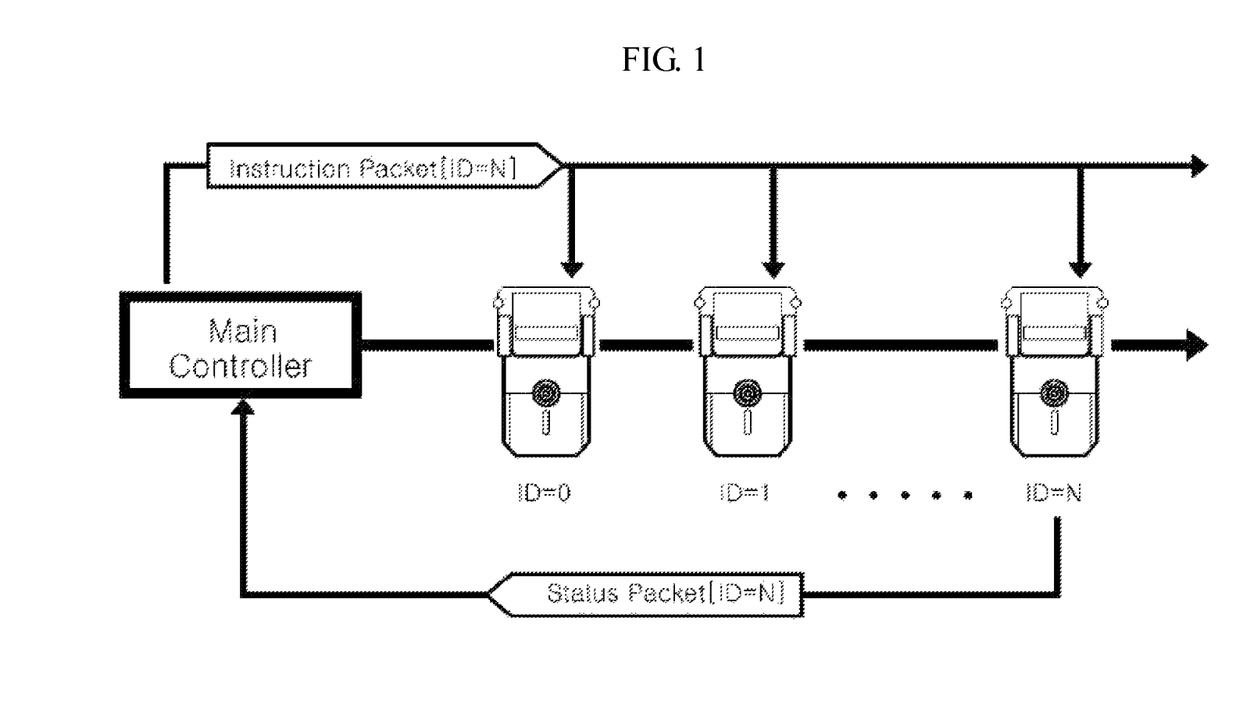
FIG. 1 is a block diagram illustrating a control flow of a network-type actuator module to explain a control method according to one embodiment of the present invention.

More specifically, referring to FIG. 1, N actuator modules are connected to one main controller in a multi-drop scheme.

In this case, the main controller and the actuator module transmit or receive packets and perform communication.

Here, the types of packets include an instruction packet transferred from the main controller to the actuator module, and a status packet transferred from the actuator module to the main controller.

Further, when the main controller transfers the instruction packet in which an ID is set to N, only a motor having an ID "N" among a plurality of motors returns the status packet and executes the instruction.

For example, since the N actuator modules are connected to one bus, and a control signal, namely, the instruction signal from the main controller includes the ID of the actuator module that is a control target, only the actuator having such an ID operates and the m response from the actuator is transferred to the main controller as a status signal.

Figure 2:
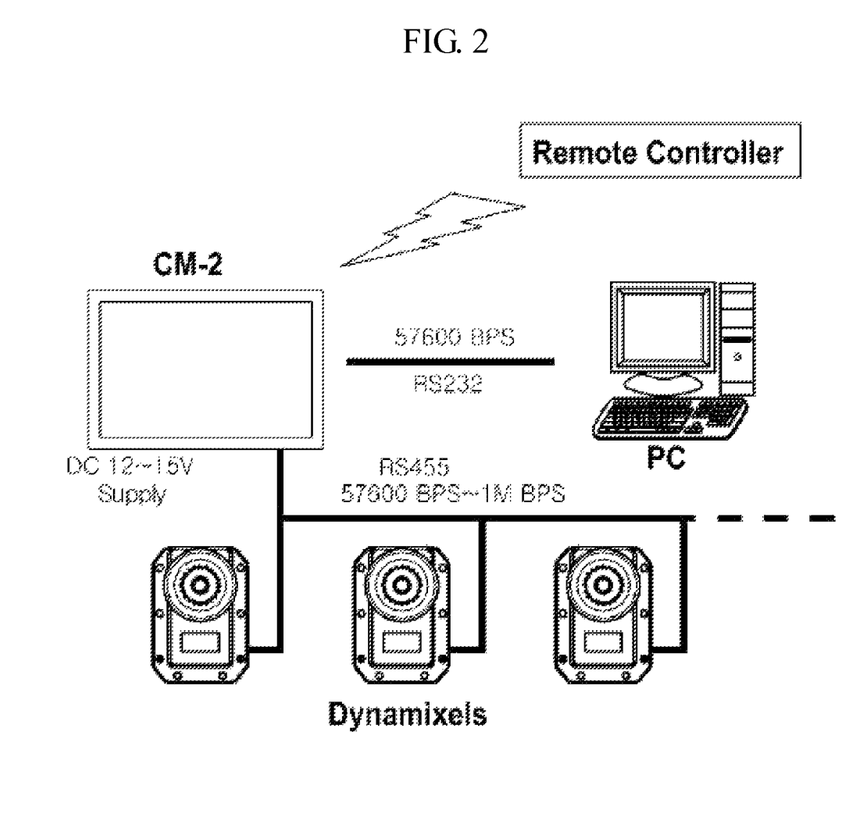
FIG. 2 is an illustrative diagram for a system configuration that enables a user to control the network-type actuator module according to one embodiment of the present invention.

Further, referring to FIG. 2, the actuator of the present invention is controlled by an instruction from the main controller, and the main controller is also connected to a user terminal, such as a PC or a wired/wireless remote controller.

In this case, when a user inputs a program for controlling each actuator through the user terminal in order to control the operation of a robot, a control signal from the user terminal is transferred to the main controller for actuator control, for example, through a bus with an RS232 scheme. The main controller converts the control signal into an instruction packet with an RS485 scheme suitable for actuator control, and transfers the instruction packet to each or all of the actuator modules in a multi-drop scheme.

Then, in a network of the multi-drop scheme of the present invention in which the large number of actuator modules are connected to the main controller, a communication protocol for input/output (I/O) and transfer of a control signal and a data signal should be supported so that signal transfer between the large number of actuator modules themselves, and between the large number of actuator modules and the main controller, can be performed in a simple and efficient scheme.

Control Table

The actuator module according to one embodiment of the present invention uses a control table for controlling the actuator module.

The control table consists of data for status and driving of the actuator module.

Values are written to the control table to drive the actuator module, and the values of the control table are read to recognize the status of the actuator module.

An exemplary control table is illustrated in FIG. 3.

As illustrated in FIG. 3, the control table includes a RAM area and an m EEPROM area, and data in the RAM area is set to an initial value each time a power supply is turned on, but a set value of data in the EEPROM area is reserved, even when the power supply is turned off.

The control table includes information including an address, an item, access, and an initial value.

The address indicates an address of a memory to or from which a value will be written or read.

The item indicates the type of data designated in each address.

The access indicates whether the item can be written or read.

The initial value indicates a factory default value when the initial value is the data in the EEPROM area, and indicates an initial value at the time of applying a power supply voltage when the initial value is the data in the RAM area.

Hereinafter, the meaning of the data designated in each address will be described.

First, the EEPROM area will be described.

OXOO and OXO1: Model number

OXO2: Version of firmware

OXO3: Unique number (ID) for identifying the actuator module. Different IDs should be assigned to the respective linked actuator modules.

OXO4: Baud rate which determines the communication rate. A calculation equation is:

Speed [BPS]=2000000/[Address4+1]

For example, data values for primary baud rates are shown in Table 1.

In the case of Universal Asynchronous Receiver/Transmitter (UART), communication does not suffer when a baud rate error is less than 3%.

TABLE 1

| Address4 | Set BPS | Goal BPS | Error |
|---|---|---|---|
| 1 | 1000000.0 | 1000000.0 | 0.000% |
| 3 | 500000.0 | 500000.0 | 0.000% |
| 4 | 400000.0 | 400000.0 | 0.000% |
| 7 | 250000.0 | 250000.0 | 0.000% |
| 9 | 200000.0 | 200000.0 | 0.000% |
| 16 | 117647.1 | 115200.0 | −2.214% |
| 34 | 57142.9 | 57600.0 | 0.749% |
| 103 | 19230.8 | 19200.0 | −0.160% |
| 207 | 9615.4 | 9600.0 | −0.160% |

0X05: This indicates a return delay time, i.e., a delay time until the status packet is returned after the instruction packet is transferred.

0X06, 0X07, 0XO8, and OXO9: Operational angle limit. An angle range in which an operation of the actuator module is allowed is set.

OXOB: Highest limit temperature. This indicates an operational limit temperature of the actuator module.

OXOC and OXOD: Lowest/highest limit voltage. These indicate an upper limit and a lower limit of an operational voltage range of the actuator module.

OXOE and OXOF: Maximum torque. These are maximum torque output values of the actuator module.

When these values are set to "0," a status enters a free run state in which there is no torque.

Maximum torque (Max Torque/Torque Limit) is assigned to two places of the EEPROM area (e.g., OXOE and OXOF), and the RAM area (e.g., OX22 and OX23). When the power supply is turned on, the value in the EEPROM area is copied to the RAM.

The torque of the actuator module is limited by values OX22 and OX23 in the RAM.

OX10: Status return level. This determines whether the actuator module returns the status packet after receiving the transferred instruction packet and has a value as shown in Table 2 below.

In the case of an instruction packet of a broadcasting ID (e.g., OXFE), no status packet is returned regardless of the status return level.

TABLE 2

| Address 16 | Status Packets Return |
|---|---|
| 0 | Not returned for all instructions |
| 1 | Returned for only instruction READ_DATA |
| 2 | Returned for all instructions |

OX11: Alarm LED. When an error is generated, the LED flickers if an error bit for each instruction has been set to 1.

An error correspondence table for each instruction is as shown in Table 3 below.

TABLE 3

| Bit | Function |
|---|---|
| Bit 7 | 0 |
| Bit 6 | If this is set to 1, the LED flickers when an instruction error is generated. |
| Bit 5 | If this is set to 1, the LED flickers when an overload error is generated. |
| Bit 4 | If this is set to 1, the LED flickers when a checksum error is generated. |
| Bit 3 | If this is set to 1, the LED flickers when a range error is generated. |
| Bit 2 | If this is set to 1, the LED flickers when an overheating error is generated. |
| Bit 1 | If this is set to 1, the LED flickers . when an angle limit error is generated. |
| Bit 0 | If this is set to 1, the LED flickers when an input voltage error is generated. |

The function of each bit is operated in a logic "OR."

In other words, if the bit is set to OXO5, the LED flickers even when an input voltage error is generated, and when an overheating error is generated.

When a situation returns to a normal situation after the error is generated, the LED stops flickering after two seconds.

OX12: Alarm shutdown. When an error is generated, the actuator module is in a torque off state, i.e., stops if the error bit for each instruction has been set to 1.

An error correspondence table for each instruction is as shown in Table 4.

TABLE 4

| Bit | Function |
|---|---|
| Bit 7 | 0 |
| Bit 6 | If this is set to 1, the torque is off when an instruction error is generated. |
| Bit 5 | If this is set to 1, the torque is off when an overload error is generated. |
| Bit 4 | If this is set to 1, the torque is off when a checksum error is generated. |
| Bit 3 | If this is set to 1, the torque is off when a range error is generated. |
| Bit 2 | If this is set to 1, the torque is off when an overheating error is generated. |
| Bit 1 | If this is set to 1, the torque is off when an angle limit error is generated. |
| Bit 0 | If this is set to 1, the torque is off when an input voltage error is generated. |

The function of each bit is operated in a logic "OR."

However, a torque off state continues even when a situation is returned to a normal situation after the error is generated, unlike the alarm LED.

Therefore, it is necessary to set torque enable [0X18] to 1 again in order to exit a shutdown state.

OX14, OX15, OX16, and OX17: Calibration. This is data for compensating for a deviation between potentiometer products, and cannot be changed by a user.

Subsequent addresses are in the RAM area.

OX18: Torque enable. When a power supply voltage is applied to the actuator module in a digital mode, a state becomes a free run state in which no torque is generated.

In this case, when 1 is set in address OX18, a state becomes a torque enabled state.

OX19: LED. When this is set to 1, the LED is turned on and when this is set to 0, the LED is turned off.

OX1A, OX1B, OX1C, and OX1D: Compliance margin and slope. A margin and a slope are set to adjust the compliance of the actuator. If the compliance is well utilized, an effect of shock absorption can be obtained.

Figure 4:
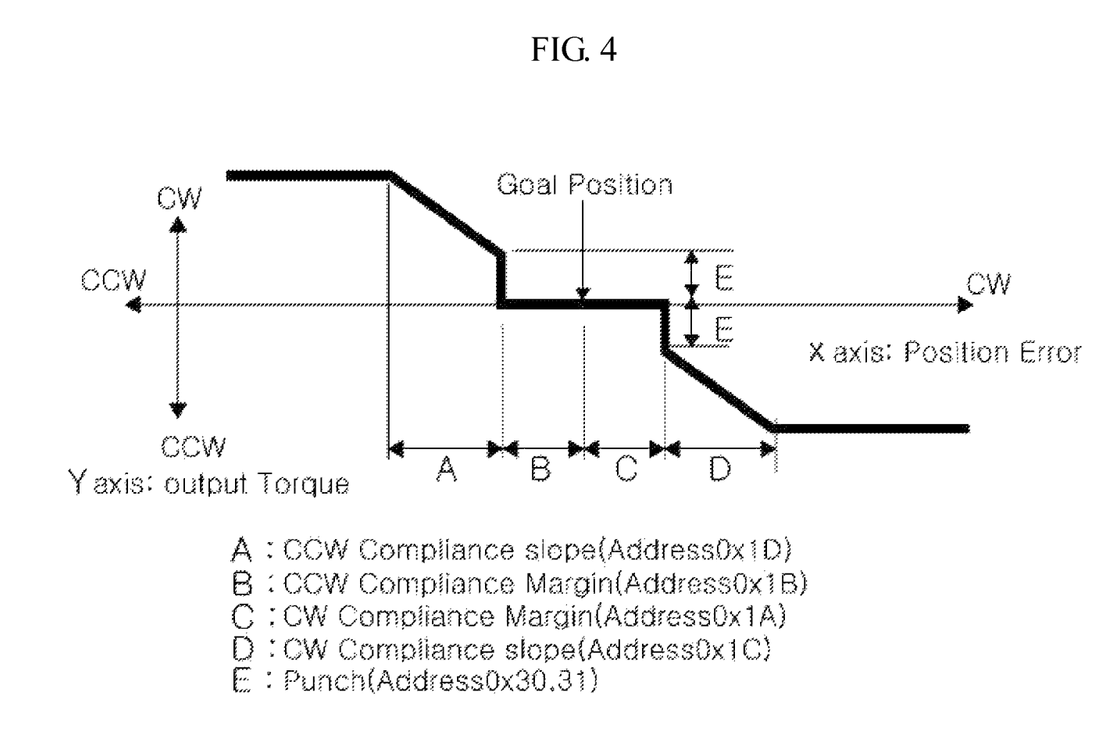
FIG. 4 is an illustrative diagram for an output curve according to a position error in control according to one embodiment of the present invention.

In an output curve according to a position error in FIG. 4, the lengths of A, B, C, and D are compliance values.

OX1E and OX1F: Goal position. These indicate a position to which the actuator module moves.

Figure 5:
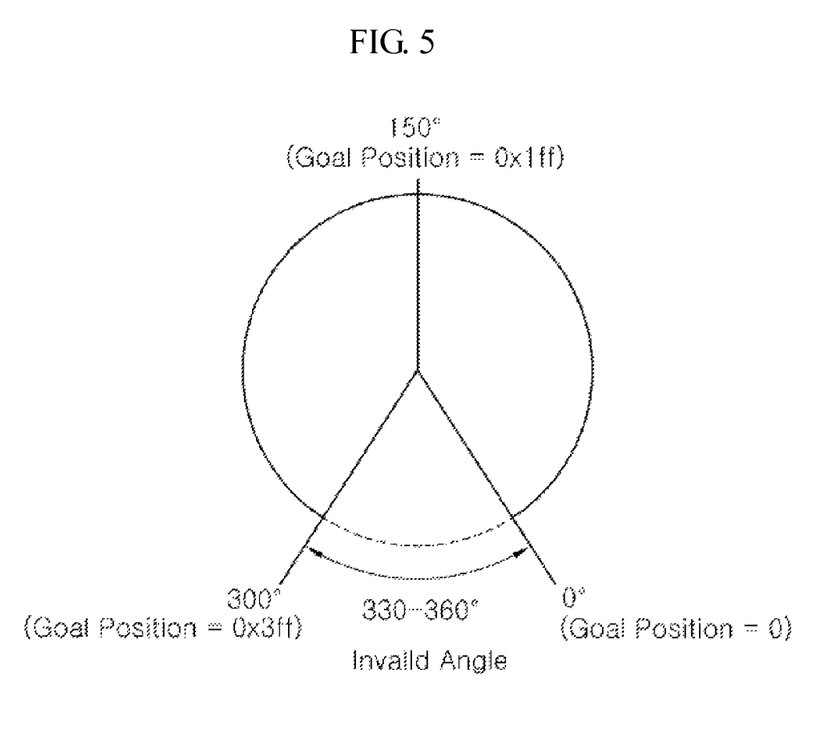
FIG. 5 is an illustrative diagram for a goal position to which the actuator module moves to explain the control method according to one embodiment of the present invention.

The actuator module moves at 300° when the value is set to a maximum value Ox3ff in FIG. 5.

OX20 and OX21: moving speed. These indicate speeds at which the actuator module moves to the goal position. When the speed is set to the maximum value Ox3ff, the actuator module moves at a speed of 70 rpm.

For reference, when the speed is set to 1, the speed is lowest, and when the speed is set to 0, the actuator module moves at highest speed possible with the current applied voltage. In other words, no speed control is performed.

OX22 and OX23: Maximum torque. These are maximum torque output values of the actuator module. When these values are set to "0," the state becomes a free run state in which there is no torque. The maximum torque (Max Torque/Torque Limit) is assigned to two places of the EEPROM area (e.g., OXOE and OXOF) and the RAM area (e.g., OX22 and OX23). When the power supply is turned on, the value in the EEPROM area is copied to the RAM. The torque of the actuator module is limited by the OX22 and OX23 values (OX22 and OX23) in the RAM.

OX24 and OX25: Present position. Present position of the actuator module.

OX26 and OX27: Present speed. Present speed of the actuator module.

OX28 and OX29: Present load. Size of a load currently driven by the actuator module. Bit 10 is a direction in which a load is applied in Table 5.

TABLE 5

| | Bit | | | | | | | | | | | |
|---|---|---|---|---|---|---|---|---|---|---|---|---|
| | 15~11 | 10 | 9 | 8 | 7 | 6 | 5 | 4 | 3 | 2 | 1 | 0 |
| Value | 0 | Load Direction | | | | Load Value | | | | | | |

Load Direction = 0: CCW Load,
Load Direction = 1: CW Load

OX2A: Present voltage. Voltage currently applied to the actuator module. This value is 10 times greater than the real voltage. In other words, when the voltage is 10V, 100 [OX64] is read.

OX2B: Present temperature. Internal temperature (° C.) of the actuator module.

OX2C: Registration instruction. This is set to 1 when an instruction is registered by an instruction REG_WRITE, and to 0 after the registered instruction has been performed by an instruction ACTION.

OX2E: Moving. This is set to 1 when the actuator module moves with its own power.

OX2F: Lock. When this is set to 1, only values of addresses 0X18 to 0X23 can be written and recording is prohibited in the other areas. The lock can be released only with the power supply off.

OX30 and OX31: Punch. Minimum current amount supplied to the motor upon driving. These have an initial value OX20 and can be set up to OX3FF.

Valid Data Range

Figure 6:
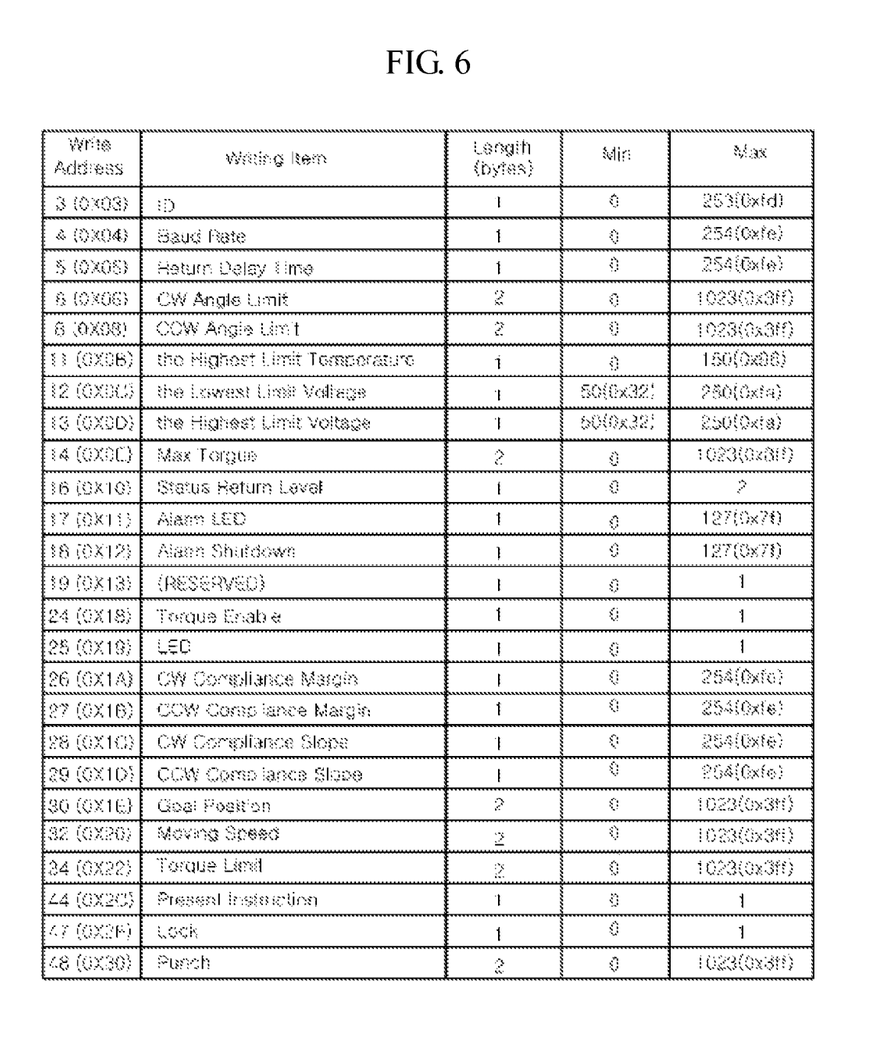
FIG. 6 is a table showing a valid area of data that a user can write according to one embodiment of the present invention.

Each data has a determined valid range. When a write instruction outside this range is transferred, an error is returned. The length and the range of the data that a user can write are shown in a table in FIG. 6. 16-bit data is indicated by 2 bytes [L] and [H]. The two bytes should be simultaneously written by one instruction packet.

Packet Structure

The instruction packet used in the present invention is a packet for the main controller to instruct the actuator module to operate, and has a structure as shown in Table 6.

TABLE 6

| 0XFF | 0XFF | ID | LENGTH | INSTRUCTION | PARAMETER 1 | ... | PARAMETER N | CHECKSUM |
|---|---|---|---|---|---|---|---|---|

OXFF OXFF: Two OXFFs in a header are signals indicating the start of the packet.

ID: This is an ID of an actuator module to be controlled by the instruction packet. There may be 254 IDs of the actuator module from OXOO to OXFD.

Broadcasting ID: ID that designates all connected actuator modules. A broadcasting ID packet in which the ID is set to OXFE is effective for all connected actuator modules. Therefore, in the case of a packet transferred to the broadcasting ID, no status packet is returned.

LENGTH: Length of the instruction packet, which has a value "number of parameters (N)+2."

INSTRUCTION: Instruction to instruct the actuator module to perform.

PARAMETERS 0 to N: Theses are used when additional information other than the instruction is necessary.

CHECK SUM: A method of calculating a check sum is as follows.

CHECK SUM=~{ID+LENGTH+INSTRUCTION+PARAMETER 1+ . . . +PARAMETER N}. When a value calculated as the check sum is greater than 255, a lower byte of a resultant value is CHECKSUM. "~" is a Not Bit operator.

The status packet used in the present invention is a packet that the actuator module returns to the main controller as a response after receiving the transferred instruction packet, and has a structure as shown in Table 7 below.

TABLE 7

| OXFF | OXFF | ID | LENGTH | PARAMETER 1 | PARAMETER 2 | ... | PARAMETER N | CHECKSUM |
|------|------|----|----|----|----|----|----|----|

Meanings of respective bytes constituting the status packet are as follows.

OXFF and OXFF: Two OXFFs in a header are signals indicating the start of the packet.

ID: ID of an actuator module that returns the status packet. There are 254 IDs of the actuator module from OXOO to OXFD.

LENGTH: Length of the status packet, which has a value "the number of parameters (N)+2."

ERROR: This indicates a status of an error generated during the operation of the actuator module. The meaning of each bit is as shown in Table 8.

TABLE 8

| Bit | Name | Content |
|-----|------|---------|
| Bit 7 | 0 | — |
| Bit 6 | Instruction error | This is set to 1 when an undefined instruction is transferred or when an instruction Action is transferredwithout an instruction reg_write. |
| Bit 5 | Overload error | This is set to 1 when a present load cannot be controlled with designated maximum torque. |
| Bit 4 | Checksum error | This is set to 1 when a checksum of the transferred instruction packet is incorrect. |
| Bit 3 | Range error | This is set to 1 when an instruction is an instruction outside a use range. |
| Bit 2 | Overheating error | This is set to 1 when an internal temperature of Dynamixel is outside an operational temperature range set in the control table. |
| Bit 1 | Angle limit error | This is set to 1 when a goal position is written as a value outside a range from CW Angle Limit to CCW Angle Limit. |
| Bit 0 | Input voltage error | This is set to 1 when an applied voltage is outside an operational voltage range set in the control table. |

PARAMETERS 0 to N: These are used when additional information other than ERROR is necessary.

CHECK SUM: A method of calculating a check sum is as follows.

CHECK SUM~{ID+LENGTH+ERROR+PARAMETER 1+ . . . +PARAMETER N}. When a value calculated as a checksum is greater than 255, a lower byte of the resultant value is CHECKSUM. "~" is a Not Bit operator.

[Instruction Set]

An instruction set used in the actuator module of the present invention includes types as shown in Table 9 below. Particularly, in the present invention, an example in which BULK_READ and BULK_WRITE are added to expand instructions is shown.

In addition, this expansion of the instruction only illustrates BULK_READ and BULK_WRITE, and it is understood that a new instruction can be added through a different definition. A corresponding parameter should be newly defined, and firmware should also be upgraded using a program.

Thus, the existing number of readable addresses may be limited to 255, whereas addresses can be expanded so that more addresses may be read using a concept of expansion according to the present invention. The same applies to the length of the data.

TABLE 9

| Instruction | Function | Value | Number of parameters |
|-------------|----------|-------|---------------------|
| PING | There is no content to be performed. This is used when a status packet is desired to be returned. | 0 × 01 | 0 |
| READ_DATA | Instruction to read a value in the control table | 0 × 02 | 2 |
| WRITE_DATA | Instruction to write a value to the control table | 0 × 03 | 2~ |
| REG_DATA | Content is similar to that of WRITE DATA, but data is written when an instruction Action arrives in a standby state. | 0 × 04 | 2~ |
| ACTION | Instruction to start an operation registered by REG_WRITE | 0 × 05 | 0 |
| RESET | Initialize control table values within the module into a factory default value | 0 × 06 | 0 |
| SYNC_WRITE | Instruction used when several modules are simultaneously controlled at a time. | 0 × 83 | 4~ |
| BULK_READ | Instruction to read data having different addresses and lengths from several modules at a time. | 0 × 92 | |
| BULK_WRITE | Instruction to write data having different addresses and lengths to several modules at a time. | 0 × 93 | |

1. WRITE_DATA

Function: Instruction to write data to the control table within the actuator module.

Length: When there is N data to be written, the length is N+3

Instruction: OXO3

Parameter 1: Start address of a place in which data is written

Parameter 2: First data to be written

Parameter 3: Second data to be written

Parameter N+1: $N^{th}$ data to be written

For example, when the ID of the connected actuator module is set to 1, an instruction to write 1 to address 3 of the control table may be transferred.

The instruction packet when the instruction is transferred to the broadcasting ID (OXFE) is as shown in Table 10 below.

TABLE 10

| OXFF | OXFF | OXFE ID | 0X04 LENGTH | 0X03 INSTRUCTION | 0X03 | 0X01 PARAMETERS | 0XF6 CHECKSUM |
|------|------|---------|-------------|------------------|------|-----------------|---------------|

In the above case, no status packet is returned since the instruction is transferred to the broadcasting ID.

2. READ_DATA

Function: Instruction to read data of the control table within the actuator module.
Length: OXO4
Instruction: OXO2
Parameter 1: Start address of the data to be read
Parameter 2: Length of the data to be read For example, when a present internal temperature of the actuator module having ID "1" is to be read, 1 byte may be read from an address OX2B value of the control table. An instruction packet in this case is as shown in Table 11.

TABLE 11

| 0XFF | 0XFF | 0X01 | 0X04 | 0X02 | 0X2B | 0X01 | 0XCC |
|------|------|------|------|------|------|------|------|
|      |      | ID   | LENGTH | INSTRUCTION | PARAMETERS |  | CHECKSUM |

Here, the returned status packet is as shown in Table 12.

TABLE 12

| 0XFF | 0XFF | 0X01 | 0X03 | 0X00 | 0X20 | 0XDB |
|------|------|------|------|------|------|------|
|      |      | ID   | LENGTH | ERROR | PARAMETER 1 | CHECKSUM |

It can be seen that the read data value is OX20, and the present internal temperature of the actuator module is about 32° C. [OX20].

3. REG_WRITE

Function: The instruction REG_WRITE is similar to the instruction WRITE_DATA, but has a different time point at which the instruction is executed. When the instruction packet REG_WRITE arrives, its value is stored in a buffer, and the WRITE operation remains in a standby state. In this case, a registered Instruction [OX2C] is set to 1. Then, when an instruction packet ACTION arrives, the registered instruction REG_WRITE is executed for the first time.
Length: N+3
Instruction: OXO4
Parameter 1: Start address of a place to which data is to be written
Parameter 2: First data to be written
Parameter 3: Second data to be written
Parameter N+1: N$^{th}$ data to be written

4. ACTION

Function: Instruction to perform a WRITE operation registered by the instruction REG_WRITE.
Length: OXO2
Instruction: OXO5
Parameter: None Here, the instruction ACTION is useful when a plurality of actuator modules should be accurately operated at the same time. When several actuator modules are controlled with an instruction packet, the actuator module that first receives the instruction and the actuator module that receives the last instruction have some time difference at an operational point of time. However, when the instructions REG_WRITE and ACTION are used, such a problem is solved. When the instruction ACTION is transferred to two or more actuator modules, the broadcasting ID (OXFE) should be used. In this case, no status packet is returned.

5. PING

Function: The instruction PING instructs nothing. This instruction is only used to receive the status packet or to confirm presence of the actuator module having a specific ID.

Length: OXO2
Instruction: OXO1
Parameter: None

For example, when the status packet of the actuator module having an ID "1" is desired to be obtained, the instruction PING may be used as shown in Table 13.

TABLE 13

| 0XFF | 0XFF | 0X01 | 0X02 | 0X01 | 0XFB |
|------|------|------|------|------|------|
|      |      | ID   | LENGTH | INSTRUCTION | CHECKSUM |

Accordingly, the returned state packet is as shown in Table 14.

TABLE 14

| 0XFF | 0XFF | 0X01 | 0X02 | 0X00 | 0XFC |
|------|------|------|------|------|------|
|      |      | ID   | LENGTH | ERROR | CHECKSUM |

Even when the broadcasting ID is designated or the status return level [OX10] is 0, the status packet is returned for the PING instruction.

6. RESET

Function: The control table of the actuator module is reset to a factory default state.
Length: OXO2
Instruction: OXO6
Parameter: None For example, the instruction packet when the actuator module having an ID "0" needs to be reset is as shown in Table 15.

TABLE 15

| 0XFF | 0XFF | 0X00 | 0X02 | 0X06 | 0XF7 |
|------|------|------|------|------|------|
|      |      | ID   | LENGTH | INSTRUCTION | CHECKSUM |

The state packet returned for the instruction RESET as described above is as shown in Table 16.

TABLE 16

| 0XFF | 0XFF | 0X00 | 0X02 | 0X00 | 0XFD |
|------|------|------|------|------|------|
|      |      | ID   | LENGTH | ERROR | CHECKSUM |

Here, after the instruction RESET is performed, the ID is changed into 1.

7. SYNC_WRITE

Function: Instruction used to simultaneously control a large number of actuator modules through one instruction packet transfer. When the instruction SYNC_WRITE is used, several instructions are transferred at a time. Accordingly, communication time is shortened in controlling the large number of actuator modules. However, the addresses and the lengths of the control table to be written to the respective actuator modules should be the same, and the IDs should be transferred as a broadcasting ID.
ID: OXFE Length: [L+1]*N+4. Here, L is the length of the data of the actuator module, and N is the number of actuator modules.
Instruction: OX83
Parameter 1: Start address of a place to which data is written
Parameter 2: Length [L] of the data to be written
Parameter 3: ID of the first actuator module
Parameter 4: First data of the first actuator module
Parameter 5: Second data of the first actuator module
. . . .
Parameter L+3: $L^{th}$ data of the first actuator module
Parameter L+4: ID of a second actuator module
Parameter L+5: First data of the second actuator module
Parameter L+6: Second data of the second actuator module
. . . .
Parameter 2L+4: $L^{th}$ data of the second actuator module
. . . .
For example, for four actuator modules, the position and the speed are assumed to be determined as follows.
An actuator module having ID "0": Move to position OX010 at speed 0X150
An actuator module having ID "1": Move to position OX220 at speed 0X360
An actuator module having ID "2": Move to position OX030 at speed 0X170
An actuator module having ID "3": Move to position OX220 at speed 0X380
An instruction packet for instructing such an operation is configured as follows.
OXFF OXFF OXFE OX18 OX83 OX1E OXO4 OXOO OX1O OXOO OX50 OX01 OX01 OX20 OX02 OX60 OX03 OX02 OX30 OX00 OX70 OX01 OX03 0X20 0X02 0X80 OX03 OX12
In this case, since the packet is transferred to the broadcasting ID, no status packet is returned.
8. BULK_READ
Function: Instruction used to read values from a large number of actuator modules at the same time through one instruction packet transfer.
The length of the packet and an idle time between returned status packets are reduced in comparison with the issuance of the instruction READ several times, thus shortening communication time.
However, the instruction cannot be used to read the value from one module several times.
When the same module ID is designated several times, only a first designated parameter is processed.
ID: OXFE
Length: 3N+3
Instruction: OX92
Parameter 1: OXOO
Parameter 2: Length [L] of data to be read from the first module
Parameter 3: ID of the first module
Parameter 4: Start address of the data to be read from the first module
. . . .
Parameter 3N+2: Length [L] of data to be read from the $N^{th}$ module
Parameter 3N+3: ID of the $N^{th}$ module
Parameter 3N+4: Start address of data to be read from the $N^{th}$ module
. . . .
For example, values are assumed to be read from two actuator modules, as follows.

An actuator module having ID "1": A goal position value (2 bytes from 0X1E) is read.
An actuator module having ID "2": A present position value (2 bytes from 0X24) is read.
An instruction packet for instructing such an operation is configured as follows.
OXFF OXFF OXFE OXO9 OX92 OXOO OXO2 OXO1 OX1E OXO2 OXO2 OX24 OX1D
In this case, the module having ID "2" monitors transfer of the status packet of the module having ID "1" (ID of an immediately previous parameter) on a data bus, and transfer its status packet as soon as the status packet of the module having ID "1" is transferred.
A returned status packet is as follows.
OXFF OXFF OXO1 OXO4 OXOO OXOO OX80 OX7A OXFF OXFF OXO2 OXO4 OXOO OXOO OX80 OX79
This is in the form in which the status packets sent by the respective modules m ID "1" and ID "2" are input in succession.
9. BULK_WRITE
Function: Instruction used to write values to a large number of actuator modules at the same time through one instruction packet transfer.
The length of the packet and an idle time between packets are reduced in comparison with the issuance of the instruction WRITE several times, thus shortening communication time.
In addition, the same ID may be designated several times in order to write values to the control table of discontinuous addresses in one module.
ID: OXFE
Length: Variable
Instruction: OX93
Parameter 1: OXOO
Parameter 2: Length [L1] of data to be written to the first module
Parameter 3: ID of the first module
Parameter 4: First data of the first module
Parameter 5: Second data of the first module
. . . .
Parameter L1+2*1+1: $L^{th}$ data of the first actuator module
Parameter L1+2*2+0: Length [L2] of data to be written to the second module
Parameter L1+2*2+1: ID of the second module
Parameter L1+2*2+2: First data of the second module
. . . .
Parameter L1+L2+ . . . +LN+2*N+1: $L^{th}$ data of the $N^{th}$ actuator module
. . . .
For example, values are assumed to be determined for two actuator modules, as follows.
An actuator module having ID "1": Move to position 0x220 at speed 0x360
An actuator module having ID "2": Change CW/CCW Compliance Slope to 0X16
An instruction packet for instructing this operation is configured as follows.
OXFF OXFF OXFE OXOD OX93 OXOO OX04 OXO1 OX2O OXO2 OX6O OXO3 OXO2 OXO2 OX1O OX1O OXB4
In this case, since the packet is transferred to the broadcasting ID, no status packet is returned.
Thus, the instruction set may be continuously added, and the content of the parameter is identified according to the respective instruction sets.

Thus, it is possible to flexibly remove restrictions due to limitation of the length of each field according to the definition of the instruction sets and parameters.

For example, it is assumed that an instruction set BULK_READ_2 is produced as 0XA0, and parameters are designated as follows.

ID: OXFE
Length:
Instruction: OXAO
Parameter 1: Lower byte of the ID of the first module
Parameter 2: Upper byte of the ID of the first module
Parameter 3: Lower byte of a start address of the data to be read from the first module
Parameter 4: Upper byte of the start address of the data to be read from the first module
Parameter 5: Lower byte of the length of the data to be read from the first module
Parameter 6: Upper byte of the length of the data to be read from the first module
. . . .

With the designation in this form, it is possible to remove a restriction that only 0 to 255 can be designated, which is a naturally occurring limitation since the ID, the address of the control table, the length of the data, and the like, consist of one byte.

The method for controlling a network-type actuator module according to the present invention is an industrially applicable invention since restrictions due to limitations of the length of each field can be flexibly removed according to the definition of the instruction set and the parameters.

What is claimed is:

1. A method for controlling a plurality of network-type actuator modules connected to a main controller in a multi-drop scheme, the method comprising:

transferring, by the main controller, a single instruction packet including a plurality of IDs to the actuator modules; and in response to receipt of the single instruction packet, transferring, by the actuator modules, each status packet corresponding to the actuator modules to the main controller, the each status packet being transferred corresponding to each of the plurality of IDs and in a sequence order of each of the plurality IDs, the sequence order being indicated by the single instruction packet, wherein the plurality of IDs include a preceding ID and a subsequent ID, and the actuator modules corresponding to the subsequent ID in the instruction packet transfer a second status packet after the actuator modules corresponding to the preceding ID have transferred a first status packet, wherein the first and second status packets are sent in order, and transfer of the first status packet of the preceding ID is monitored, and the second status packet is sent as soon as detection of the first status packet of the preceding ID being transferred, and wherein a response delay between the first packet and the second packet, which is a return delay time, is removed to shorten the return delay time.

2. The method according to claim 1, wherein a length of data to be read from the actuator modules corresponds to the each of the plurality of IDs.

3. The method according to claim 2, wherein each of the plurality of IDs, the length of the data, and an address of the data includes 2 bytes that include an upper byte and a lower byte.

4. The method according to claim 2, wherein an address of the data to be read from the actuator modules corresponds to the each of the plurality of IDs which is repeatedly represented in the sequence order of the IDs.

* * * * *